(12) United States Patent
Kim

(10) Patent No.: US 8,270,054 B2
(45) Date of Patent: *Sep. 18, 2012

(54) HIGH-SPEED MULTI-DIMENSIONAL BEAM SCANNING SYSTEM WITH ANGLE AMPLIFICATION

(75) Inventor: Jungsang Kim, Chapel Hill, NC (US)

(73) Assignee: Duke University, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 13/166,925

(22) Filed: Jun. 23, 2011

(65) Prior Publication Data

US 2011/0299147 A1 Dec. 8, 2011

Related U.S. Application Data

(63) Continuation of application No. 12/324,152, filed on Nov. 26, 2008, now Pat. No. 8,081,364.

(60) Provisional application No. 60/990,506, filed on Nov. 27, 2007.

(51) Int. Cl.
*G02B 26/10* (2006.01)
(52) U.S. Cl. .................................... 359/208.1
(58) Field of Classification Search ............... 359/202.1, 359/212.2–215.1, 223.1, 224.1, 850–852
See application file for complete search history.

(56) References Cited

U.S. PATENT DOCUMENTS

| | | | |
|---|---|---|---|
| 5,059,009 A | 10/1991 | McKinley | |
| 5,524,153 A | 6/1996 | Laor | |
| 5,526,191 A | 6/1996 | Nishii et al. | |
| 6,002,818 A | 12/1999 | Fatehi et al. | |
| 6,330,102 B1 | 12/2001 | Daneman et al. | |
| 6,437,902 B2 | 8/2002 | Daneman et al. | |
| 6,487,334 B2 | 11/2002 | Ducellier et al. | |
| 6,603,894 B1 | 8/2003 | Pu | |
| 6,776,492 B1 | 8/2004 | Chang | |
| 6,836,381 B2 | 12/2004 | Giles et al. | |
| 7,023,604 B2 | 4/2006 | Behin et al. | |
| 8,081,364 B2 * | 12/2011 | Kim | 359/208.1 |
| 2004/0257631 A1 | 12/2004 | Lee | |

OTHER PUBLICATIONS

Doak, Jennifer L., "U.S. Appl. No. 12/324,152 Notice of Allowance Aug. 22, 2011", , Publisher: USPTO, Published in: US.
Doak, Jennifer L., "U.S. Appl. No. 12/324,152 Restriction Requirement Nov. 5, 2010"Publisher: USPTO, Published in: US.
Doak, Jennifer L., "U.S. Appl. No. 12/324,152 Office Action Feb. 17, 2011", , Publisher: USPTO, Published in: US.

* cited by examiner

*Primary Examiner* — Jennifer L. Doak
(74) *Attorney, Agent, or Firm* — Kaplan Breyer Schwarz & Ottesen, LLP

(57) ABSTRACT

A beam-steering system having high positional resolution and fast switching speed is disclosed. Embodiments of the beam-steering system comprise a diffraction limited optical system that includes a reflective imager and two controllably rotatable MEMS elements. The optical system is characterized by a folded optical path, wherein light propagating on the path is incident on each MEMS element more than once. Each MEMS element imparts an optical effect, such as angular change, on the output beam. By virtue of the fact that the optical system is multi-bounce optical system, the optical effect at each MEMS element is multiplied by the number of times the light hits that MEMS element.

17 Claims, 10 Drawing Sheets

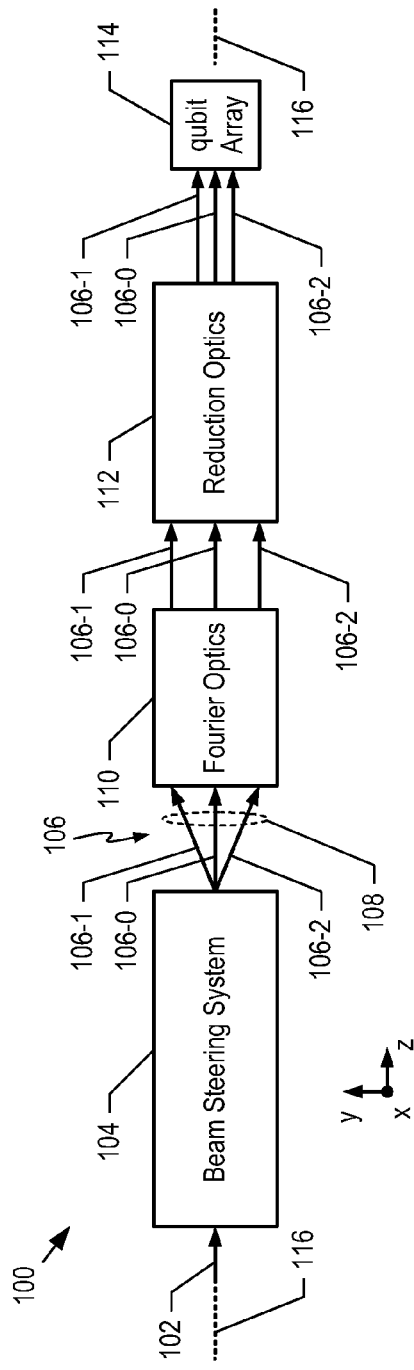
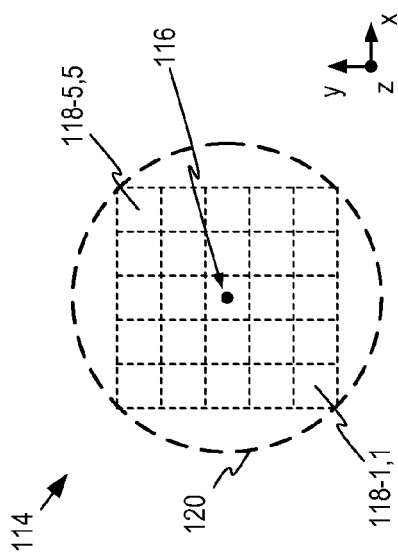
FIG. 1A
FIG. 1B

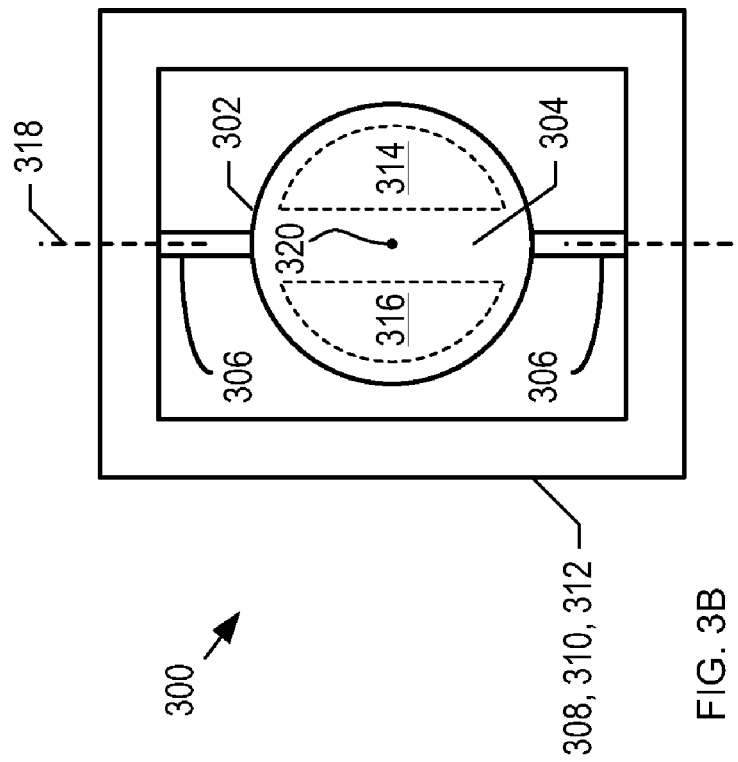
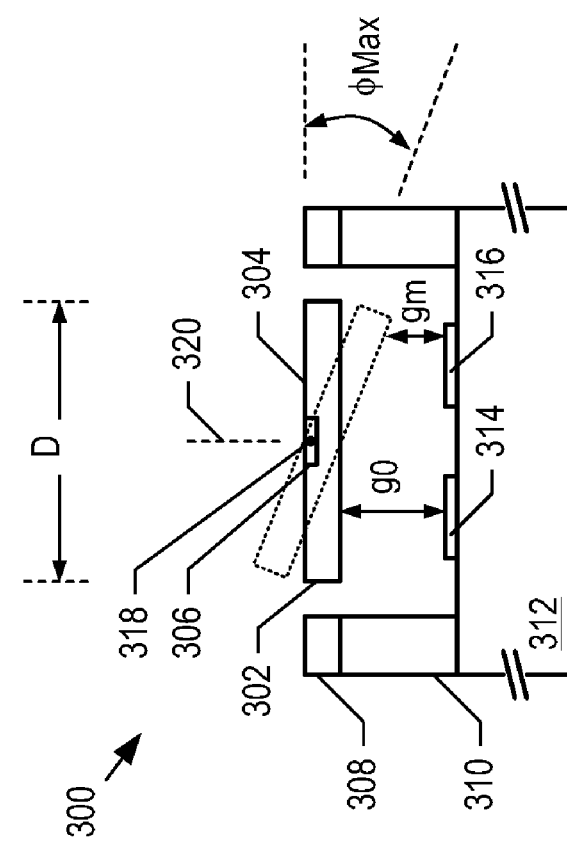
FIG. 3B
FIG. 3A

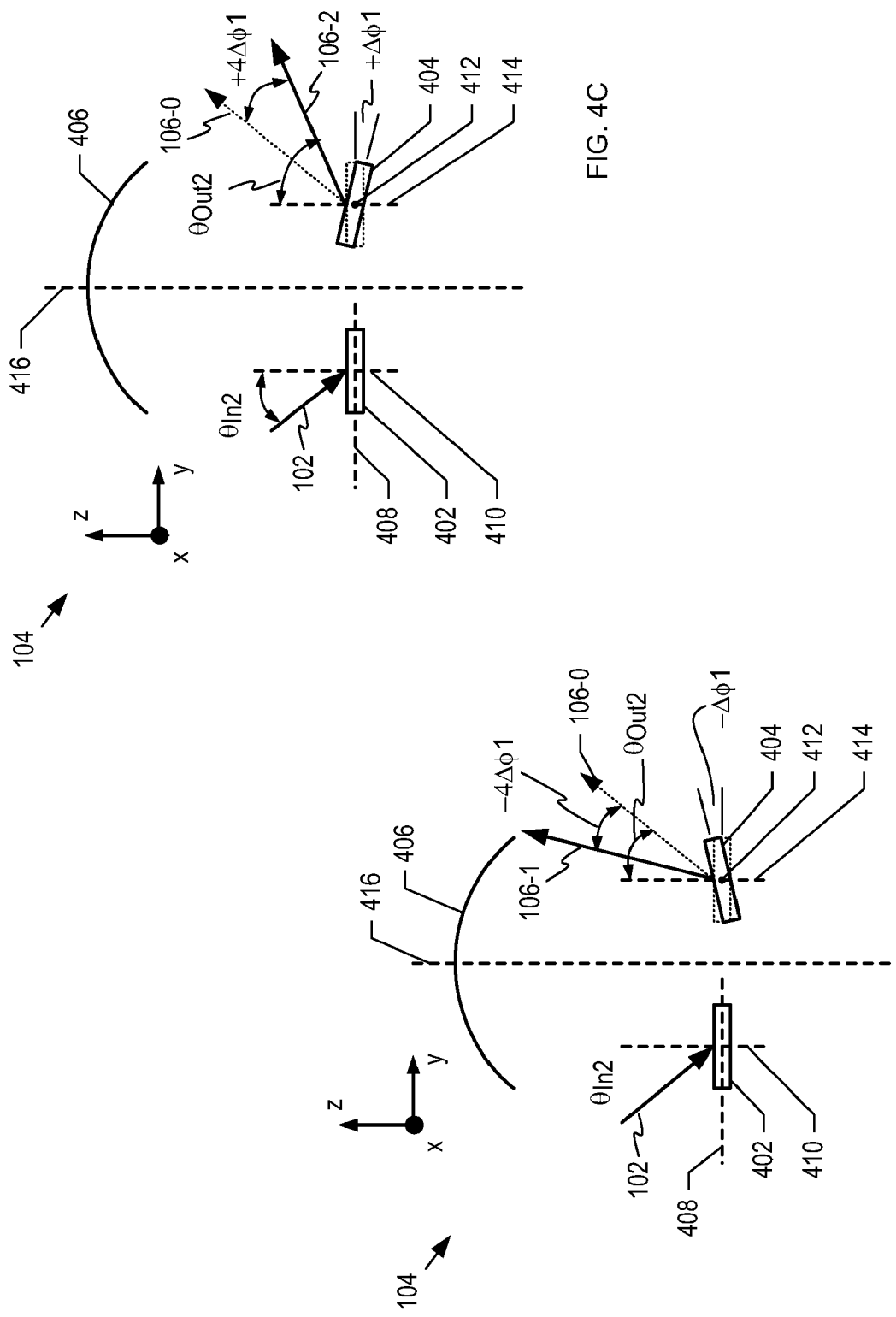

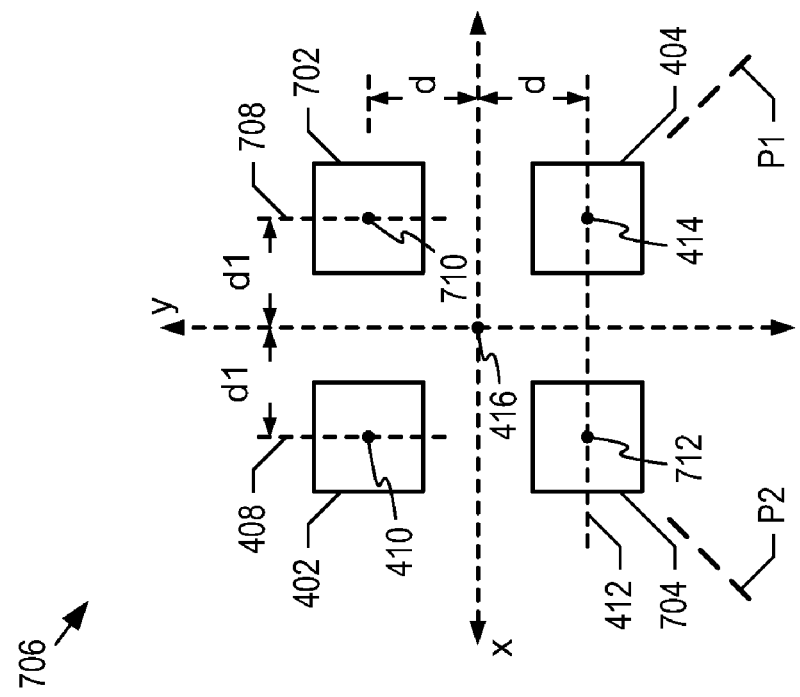
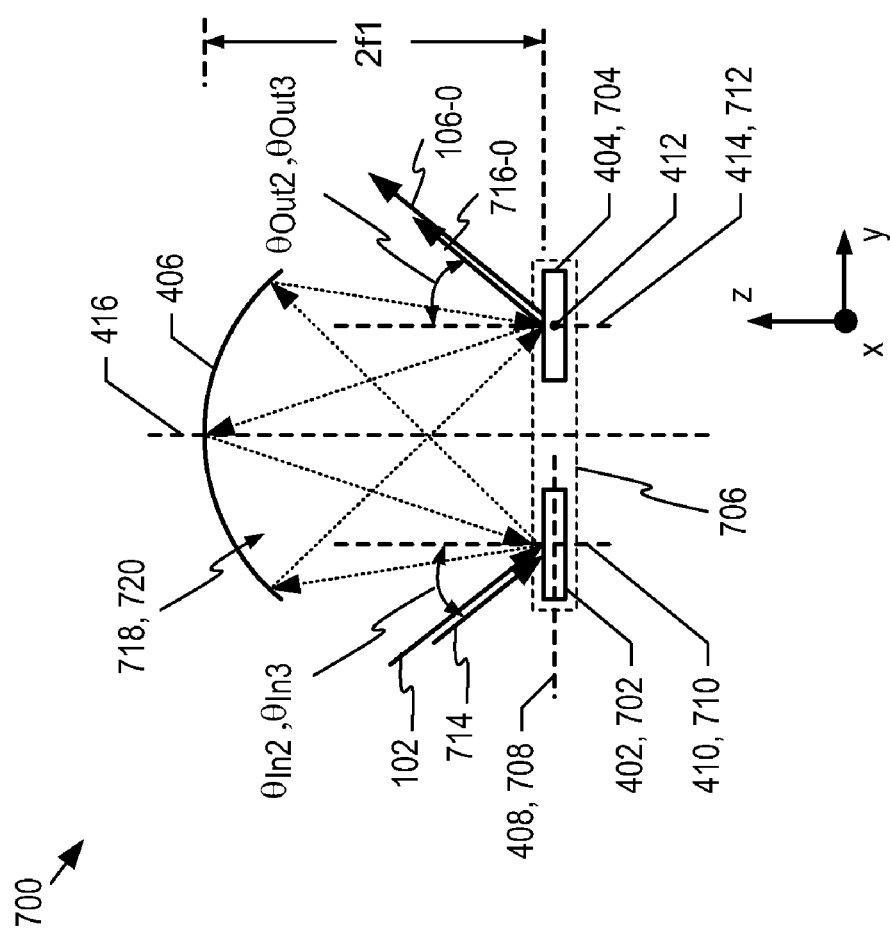
FIG. 7B
FIG. 7A

US 8,270,054 B2

HIGH-SPEED MULTI-DIMENSIONAL BEAM SCANNING SYSTEM WITH ANGLE AMPLIFICATION

STATEMENT OF RELATED CASES

This case is a continuation of co-pending U.S. patent application Ser. No. 12/324,152, filed Nov. 26, 2008, which claims the benefit of provisional patent application U.S. Ser. No. 60/990,506, filed 27 Nov. 2007, each of which is incorporated herein by reference.

STATEMENT REGARDING FEDERALLY-SPONSORED RESEARCH

This invention was made with Government support under contract CCF-0520702, awarded by the National Science Foundation. The Government has certain rights in the invention.

FIELD OF THE INVENTION

The present invention relates to beam-steering in general, and, more particularly, to two-dimensional beam-steering.

BACKGROUND OF THE INVENTION

There are applications in which it is desirable to direct a light beam to any point in a three-dimensional space. Often, the light beam must be switched between two points with high speed. To satisfy this need, two-dimensional beam-steering systems based on rotating micromechanical mirrors have been developed.

Micro-Electro-Mechanical Systems (MEMS) technology has been widely applied to optical beam-steering applications. MEMS devices are capable of switching speeds on the order of tens of kHz and are therefore well-suited to optical applications that require switching times of a few hundred microseconds.

But there are applications, such as atomic-based quantum computing, that require switching speeds on the order of 1 microsecond. In a quantum processor, a light beam is used to interrogate particles, referred to as qubits, which are located within a two-dimensional lattice. Qubits are typically electrons, photons, or ions whose charge or polarization can be changed by shining light of a particular wavelength on them. These qubits are typically separated from one another within the lattice by only a few microns.

High-speed switching is particularly important in quantum processing because qubits must typically be addressed (illuminated) at frequencies greater than 1 MHz to keep them from randomly changing state. Because MEMS devices have been inadequate for this application, switching devices based on acousto-optical or electro-optical deflectors have been used. Although they possess the requisite speed, these devices exhibit other drawbacks.

In particular, acousto-optical or electro-optical deflectors are difficult to wavelength tune and are typically suitable for only a single wavelength. Also, acousto-optical deflectors induce small frequency shifts in the laser that must be managed. These issues are problematic because different qubits in the processing lattice will sometimes require different, specific wavelengths of light to effect a phase change. For example, a trapped ion might require ultraviolet light (of a specific wavelength), while a trapped neutral atom might require infrared light. In fact, a single qubit might require two different wavelengths of light at the same time to cause a phase change.

Additional drawback are that acousto-optical deflectors are power intensive and electro-optic deflectors require large operating voltages while providing only limited angular range.

A beam-steering system that is readily tunable and that is capable of high speed switching with position resolution of a few microns would therefore represent a significant advance in the state of the art.

SUMMARY OF THE INVENTION

The present invention enables steering of an optical beam without some of the costs and disadvantages of the prior art. Embodiments of the present invention provide a substantially diffraction-limited optical system that enables switching of an optical beam between points in an area with high speed. Embodiments of the invention are well-suited for use in one- and two-dimensional beam-steering applications such as optical switching in communications systems, data storage, laser-guided weaponry, and displays, confocal microscopy, cell manipulation systems (e.g., optical tweezers, etc.), and imaging systems. Embodiments of the present invention are particularly well-suited for use in high-speed beam-steering applications, such as quantum processing and quantum computing.

The illustrative embodiment of the present invention is a two-dimensional beam-steering system that comprises a reflective imager and two mirrors, each of which is controllably rotatable about a single rotation axis. The imager and mirrors collectively define a folded optical path wherein a light beam is incident on each of the mirrors twice. The rotation axes of the two mirrors are orthogonal to one another; therefore, the two mirrors can cooperatively steer an incident beam along any angle within a two-dimensional angular cone. By virtue of the fact that the light beam hits each mirror twice, rotation of a mirror induces an angular change on the output beam that is at least twice the angular change induced by prior-art beam-steering systems. As a result, for a given angular range of the output beam, a mirror requires half of the rotation range of a prior-art mirror. This reduced rotation range requirement provides the present invention advantages over the prior art, such as faster response, lower polarization effects, and lower drive voltage.

In some embodiments, reflective elements are used in place of the mirrors to enable the beam-steering system to induce other optical effects on the output beam. These optical effects include, without limitation, wavefront modulation, aberration correction, spatial modulation, phase modulation, chromatic filtering, polarization filtering, polarization rotation, and other polarization effects.

An embodiment of the present invention comprises: an optical system, wherein the optical system receives a first beam on a first input path that is at a first input angle, $\theta_{In1}$, with respect to an optical axis, and wherein the optical system directs the first beam on a first output path that is at a first output angle, $\theta_{Out1}$, with respect to the optical axis, and further wherein the optical system comprises; a first element whose angular position about a first rotation axis is controllable; a second element whose angular position about a second rotation axis is controllable; and a reflective imager, wherein a change in the angular position of the first element about the first rotation axis by $\Delta\phi 1$ results in a change in $\theta_{Out1}$ that is greater than $|2 \times \Delta\phi 1|$, and wherein a change in the angular position of the second element about the second rotation axis by $\Delta\phi_2$ results in a change in $\theta_{Out1}$ that is greater than $|2\times\Delta\phi_2|$.

BRIEF DESCRIPTION OF THE DRAWINGS

FIG. 1A depicts a schematic diagram of a portion of a quantum information processor in accordance with an illustrative embodiment of the present invention.

FIG. 1B depicts a schematic diagram of qubit array 114 in accordance with an illustrative embodiment of the present invention.

FIG. 3A depicts a cross-sectional view of a conventional torsional MEMS mirror.

FIG. 3B depicts a top view of a conventional torsional MEMS mirror.

FIG. 4B depicts beam-steering system 104 in a first activated state in accordance with the illustrative embodiment of the present invention.

FIG. 4C depicts beam-steering system 104 in a second activated state in accordance with the illustrative embodiment of the present invention.

FIG. 7A depicts a schematic diagram of details of a two-dimensional beam-steering system in accordance with a second alternative embodiment of the present invention.

FIG. 7B depicts a schematic diagram of details of element array 706.

DETAILED DESCRIPTION

Figure 2A:
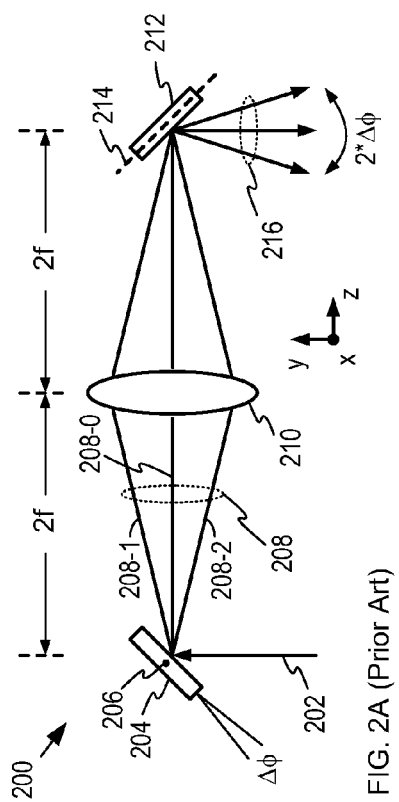
FIG. 2A depicts conventional two-dimensional beam-steering system 200 based on transmissive optics.

The following terms are defined for use in this Specification, including the appended claims:

Orthogonal is defined as an orientation of at least two elements, wherein the orientation composes only right angles, whether in a single plane or in parallel planes. For example, a first line in a first plane and a second line in a second plane are considered orthogonal if the projection of the second line onto the first plane is orthogonal with the first line in the first plane.

Quiescent state is defined as a non-electrically activated state. For example, a beam-steering system comprising controllably rotatable elements is in its quiescent state when its elements are unrotated from their as-fabricated positions. Further, a controllably rotatable element is in its quiescent state when its control voltages are equal to zero and it is unrotated from its as-fabricated position.

Single-bounce optical system is defined as an optical system that comprises a plurality of controllably rotatable elements, wherein the optical path of the optical system is incident on each controllably rotatable element once.

Multi-bounce optical system is defined as an optical system that comprises a plurality of controllably rotatable elements, wherein the optical path of the optical system is incident on each controllably rotatable element more than once FIG. 1A depicts a schematic diagram of a portion of a quantum information processor in accordance with an illustrative embodiment of the present invention. Processor 100 comprises input beam 102, beam-steering system 104, Fourier optics 110, telescope 112, and qubit array 114. Input beam 102, beam-steering system 104, Fourier optics 110, and telescope 112 are substantially concentric along principle axis 116.

FIG. 1B depicts a schematic diagram of qubit array 114 in accordance with an illustrative embodiment of the present invention. Qubit array 114 comprises qubits 118-1,1 through 118-5,5 (collectively referred to as qubits 118). Qubits 118 are arranged in a 5×5 regular array having an array spacing of approximately 8 microns in both the x-direction and y-direction. In some embodiments, a state change of one or more of qubits 118 requires simultaneous excitation by multiple light beams having different wavelengths.

Beam-steering system 104, Fourier optics 110, and telescope 112 collectively define a diffraction-limited optical system capable of steering light of input beam 102 to any qubit 118-$i,j$ (where each of i and j is an integer within the range of 1 through 5) in qubit array 114. In order to access each of qubits 118, therefore, the optical system must be capable of rapidly directing output beam 106 to any point within area 120, which represents the cross-sectional area of two-dimensional angle cone 108 at qubit array 114. It should be noted that the number of elements in qubit array 114 is selected for exemplary purposes only and that the present invention is applicable to qubit arrays having any number of elements.

Input beam 102 is a monochromatic light signal having a wavelength suitable for the excitation of atoms within qubit array 114. The wavelength for input beam 102 is selected based upon the particular type of atom to be excited. For example, in the illustrative embodiment, input beam 102 has a wavelength of 780 nanometer (nm), which is suitable for exciting rubidium atoms. In some embodiments, input beam 102 comprises multiple wavelengths. It will be clear to one skilled in the art, after reading this specification, how to specify, make, and use alternative embodiments of the present invention that operate at any desired wavelength or wavelengths.

Beam-steering system 104 is an optical system that receives input beam 102 and provides output beam 106. Input beam 102 is received at a fixed angle with respect to the optical axis of beam steering system 104. Output beam 106 is provided at any angle within the two-dimensional angle cone 108. In FIG. 1A, output beam 106 is depicted as three distinct output beams: (1) 106-0, coincident with and directed along principle axis 116; (2) 106-1, directed along the extreme negative angle within the y-z plane; and (3) 106-2, directed along the extreme positive angle within the y-z plane. Output beams 106-1 and 106-2 represent the extreme angles of output beam 106 within the y-z plane of two-dimensional angle cone 108, while beam 106-0 represents output beam 106 when beam-steering system 104 is in its quiescent state. Those skilled in the art will understand that output beam 106 is also characterized by output beams within the x-z plane, as well as a continuum of angles in between the y-z and x-z planes; however, for clarity, these output beams are not depicted. Beam-steering system 104 is described in more detail below and with respect to FIGS. 4A-C and 5.

Fourier optics 110 is an optics arrangement that receives output beam 106 at an angle with respect to principle axis 116 and translates the angle of the received beam into a lateral shift from principle axis 116. In some embodiments, Fourier optics 110 includes a relay stage. In some embodiments, Fourier optics 110 includes a spatial filter.

Telescope 112 is a telescope imager for scaling the spatial distribution of output beams 106 from that provided by Fourier optics 110 to the spatial resolution of the qubits in qubit array 114.

In some embodiments, operation at more than one wavelength of light is desirable. As a result, in some embodiments, the lenses included in each of Fourier optics 110 and telescope 112 are suitable for low-aberration operation at multiple wavelengths.

Principle axis 116 represents the direction of propagation of input beam 102 and output beam 106 when beam-steering system 104 is in its quiescent state.

In operation, processor 100 steers output beam 106 by redirecting input beam 102 along an angle relative to principle axis 116. Fourier optics 110 receives output beam 106 and provides it as a light beam that propagates along a direction substantially parallel to principle axis 116. The angle of output beam 106, as received by Fourier optics 110, is converted into a lateral shift from principle axis 116. Telescope 112 receives output beam 106 and provides demagnification to match the spatial resolution necessary for interrogating individual qubits of qubit array 114.

FIG. 2A depicts conventional two-dimensional beam steering system 200 based on transmissive optics. Beam steering system 200 is discussed here to provide background for the discussion of inventive beam steering system 104.

Beam-steering system 200 comprises mirror 204, lens 210, and mirror 212. Mirrors 204 and 212 are rotatable mirrors that are reflective for input beam 200. Mirror 204 is controllably rotatable about rotation axis 206. Mirror 212 is controllably rotatable about rotation axis 214. By virtue of the fact that rotation axes 206 and 214 are orthogonal to one another, mirrors 204 and 212 cooperatively provide two-dimensional beam-steering.

Lens 210 is a conventional transmissive lens having a focal length of f. Mirrors 204 and 212 are located at a distance of 2×f from lens 210. As a result, the surface of mirror 204 is substantially imaged onto the surface of mirror 212.

In operation, mirror 204 receives input beam 202 and reflects it as light beam 208. The path of light beam 208 within the y-z plane is dictated by the rotation angle of mirror 204 about rotation axis 206. Light beams 208-1 and 208-2 represent the extreme paths for light beam 208 within the y-z plane. Light beam 208-0 represents the principle path for light beam 208 (i.e., the path for light beam 208 when mirror 204 is in its quiescent state).

Mirror 212 receives light beam 208 and reflects it as output beam 216. The path of output beam 216, into and out of the page as depicted in FIG. 2, is dictated by the rotation angle of mirror 212 about rotation axis 214.

It will be apparent to one skilled in the art that a change in the rotation angle of either of mirrors 204 and 212 about their respective rotation axes will result in a change in the angle of output beam 216 by an amount equal to twice that rotation. As a result, a maximum desired angular range for output beam 216, $\theta_{Max}$, requires an maximum rotation range, $\phi_{Max}$, for mirror 204, where $\phi_{Max}=\theta_{Max}/2$.

Although beam-steering system 200 is suitable for steering output beam 216 in two-dimensions, it has several key disadvantages. First, the angles of incidence for input beam 202 at mirror 204 and light beam 208 at mirror 212 are very high (approximately 45 degrees). This typically results in polarization dependent operation. Second, even with a magnification by a factor of two, many applications require mirrors that have a large angular range. This can be difficult to achieve for MEMS devices, particularly if high-speed is also required. Third, refractive lenses typically exhibit chromatic dispersion, which makes operation at multiple wavelengths difficult. Fourth, transmissive optical systems are large and notoriously difficult to align.

Figure 2B:
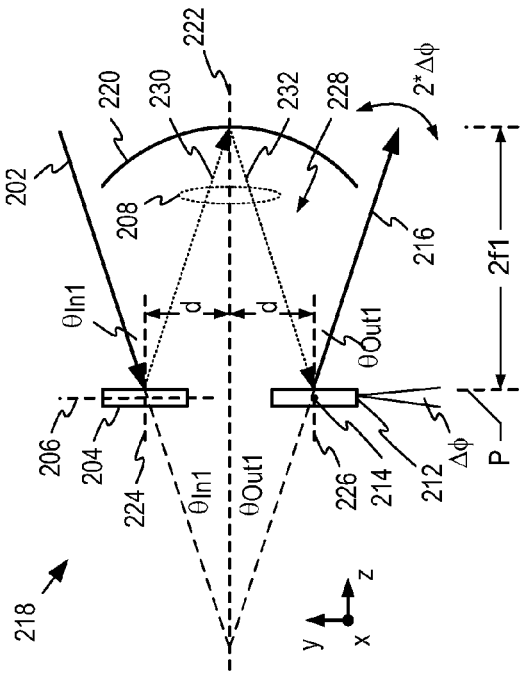
FIG. 2B depicts a schematic diagram of details of a two-dimensional beam-steering system based on reflective optics.

FIG. 2B depicts a schematic diagram of details of a two-dimensional beam-steering system based on reflective optics. Beam-steering system 218 comprises mirror 204, mirror 212, and reflective imager 220. Beam-steering system 218 is an optical analog to beam-steering system 200; however, beam-steering system 218 is provides a folded optical path for light beam 208.

Reflective imager 220 comprises a spherical mirror having an optical axis 222 and a focal length f1. In some embodiments reflective imager 220 comprises an element other than a spherical mirror. Other elements suitable for use in reflective imager 220 include spherical mirrors, elliptical mirrors, aspheric mirrors, or mirrors having complex surface functions.

Mirrors 204 and 212 are substantially coplanar, wherein the reflective surface of each mirror aligns with plane P. Plane P is located at a distance of 2×f1 from reflective imager 220. Rotation axes 206 and 214 are in an orthogonal relationship to one another; therefore, they collectively enable two-dimensional beam-steering. Mirror 204 is characterized by mirror optical axis of 224, which intersects rotation axis 206. Mirror 212 is characterized by mirror optical axis of 226, which intersects rotation axis 214. Mirror optical axes 224 and 226 are substantially parallel and coplanar with optical axis 222. Further, mirror optical axes 224 and 226 are at an equidistant distance c from optical axis 222.

Input beam 202 is received by mirror 204 at input angle $\theta_{In1}$. Mirror 204 reflects input beam 202 as light beam 208 on path 230. Light beam 208 is received by reflective imager 220 at optical axis 222 and reflected on path 232. Path 230 and 232 collectively define folded optical path 228. Light beam 208 is received by mirror 212 and reflected as output beam 216 at angle $\theta_{Out1}$. When beam-steering system 218 is in its quiescent state, $\theta_{In1}$ and $\theta_{Out1}$ are equal.

FIGS. 3A and 3B depict cross-sectional and top views, respectively, of a conventional torsional MEMS mirror. Mirror 300 is discussed here to provide background for the discussion of inventive beam steering system 104. Mirror 300 is representative of elements 202 and 204.

Mirror 300 is a MEMS device that is controllably rotatable about rotation axis 318. Mirror 300 comprises plate 302, surface 304, tethers 306, frame 308, spacer 310, substrate 312, and electrodes 314 and 316.

Typically, plate 302, tethers 306, and frame 308 are sculpted from a single layer of structural material. Materials suitable for use as MEMS structural material include, without limitation: single-crystal semiconductors, such as silicon, gallium arsenide, germanium, silicon carbide, and the like; polycrystalline semiconductors; ceramics; metals, polymers, and glasses.

Plate 302 is a structurally rigid circular region of structural material. Plate 302 commonly has a thickness within the range of approximately 300 nm to approximately 50 microns. Diameter, D, of plate 302 is sufficient to reflect input beam 202 without inducing clipping. The thickness of plate 302 is suitable for supporting the formation of a mirror in or on surface 304 such the resulting structure exhibits negligible curvature. For devices used in high-speed applications, it is desirable to keep the thickness of plate 302 as thin as possible to reduce the moment of inertia of the mirror plate.

Tethers 306 are mechanically connected between plate 302 and frame 308. Tethers 306 are torsional springs that enable the rotation of plate 302 about rotation axis 318. Tethers 306 define rotation axis 318, which bisects the plate 302. As a result, the center of plate 302 remains substantially fixed in space when plate 302 rotates about rotation axis 318. Tethers 306 provide a restoring force that returns plate 302 to its quiescent position upon the removal of an actuation force. The shape and length of tethers 306 are determined by the desired response time and drive voltage for mirror 300. Conventional MEMS torsional springs comprise structural elements such as straight beam tethers, serpentine springs, and the like.

It should be noted that for a typical MEMS element, the distance between rotation axis 318 and the plane of surface 304 is negligible.

In its quiescent state, plate 302 is separated from each of underlying electrodes 314 and 316 by an initial air gap $g_o$.

In response to a drive voltage applied between electrode 314 and plate 302, plate 302 rotates counter-clockwise about rotation axis 318. In response to a drive voltage applied between electrode 316 and plate 302, plate 302 rotates clockwise about rotation axis 318. The applied voltages generate an electrostatic force on plate 302, the magnitude of which is approximately inversely proportional to the square of the separation between the electrode and mirror plate.

A change in the rotation angle of either of mirrors 204 and 212 about their respective rotation axes will result in a change in the angle of output beam 216 by an amount equal to twice that rotation angle. As a result, an angular range of $\phi_{Max}$ of each of mirrors 204 and 212 translates into an angular range of $2\phi_{Max}$ for output beam 216 in the x-z plane and y-z plane, respectively.

Beam-steering system 218 has several advantages over beam-steering system 200, by virtue of its folded optical path. First, the angle of incidence for the light beams at the mirrors is reduced; therefore, polarization dependence is also reduced. Second, a reflective element typically has significantly less chromatic dispersion than a transmissive element. As a result, beam-steering system 218 can be less wavelength sensitive than beam-steering system 200. Third, since they are coplanar, mirrors 202 and 204 can be fabricated on a single substrate. Finally, beam-steering system 218 is more compact than beam-steering system 200 and typically easier to align.

Unfortunately, beam-steering system 218 does not offer a significant advantage over beam-steering system 200 with regard to maximum angular range and response speed.

The design of a torsional MEMS mirror is a delicate balance within a multi-dimensional design space. It typically requires a trade-off between the maximum angular range, the speed at which the device responds to a change in a control signal, the magnitude of the control voltage, and the size of the mirror.

The maximum rotation angle, $\phi_{Max}$, for plate 302 is substantially determined by an electrostatic instability that occurs when the separation between plate 302 and its driven electrode is reduced to approximately ⅔ of initial gap $g_o$. At this point, plate 302 accelerates uncontrollably until it contacts the substrate. This is commonly referred to as electrostatic "snap-down."

Ways to increase $\phi_{Max}$ include reducing the diameter D of plate 302 or increasing initial air gap $g_o$. For most optical applications, however, the diameter, D, of plate 302 is determined by the requirements of its optical system. Increasing $g_o$ can be problematic since it results in a higher required drive voltage for the device.

In many applications, including beam-steering for quantum processing, fast response time is a critical device parameter. Traditionally, fast response time has been achieved by sacrificing angular range.

In some prior art devices, an increased drive voltage has been used to more rapidly drive a mirror to a desired rotation angle. Unfortunately, practical limitations on absolute voltage level, as well as voltage slew rate can limit the effectiveness of this approach. In addition, high-voltage electronics are typically expensive and less reliable than conventional electronics.

The inventors recognized that a torsional element requires less time to move a smaller distance. As a result, response time can be improved by limiting the range of motion of a torsional element. At the optical system level, therefore, the response time for beam steering system 218 can be improved by reducing the magnitude of the angular change of its torsional mirrors necessary to induce a desired change in the output angle of an output beam from the system. The present invention accomplishes this through a change in the optical system that magnifies the effect of each mirror's rotation angle on the angle on the direction of the output beam. This obviates the need to increase the maximum angular range of the mirror itself. As a result, some or all of the disadvantages discussed above can be mitigated or eliminated.

Figure 4A:
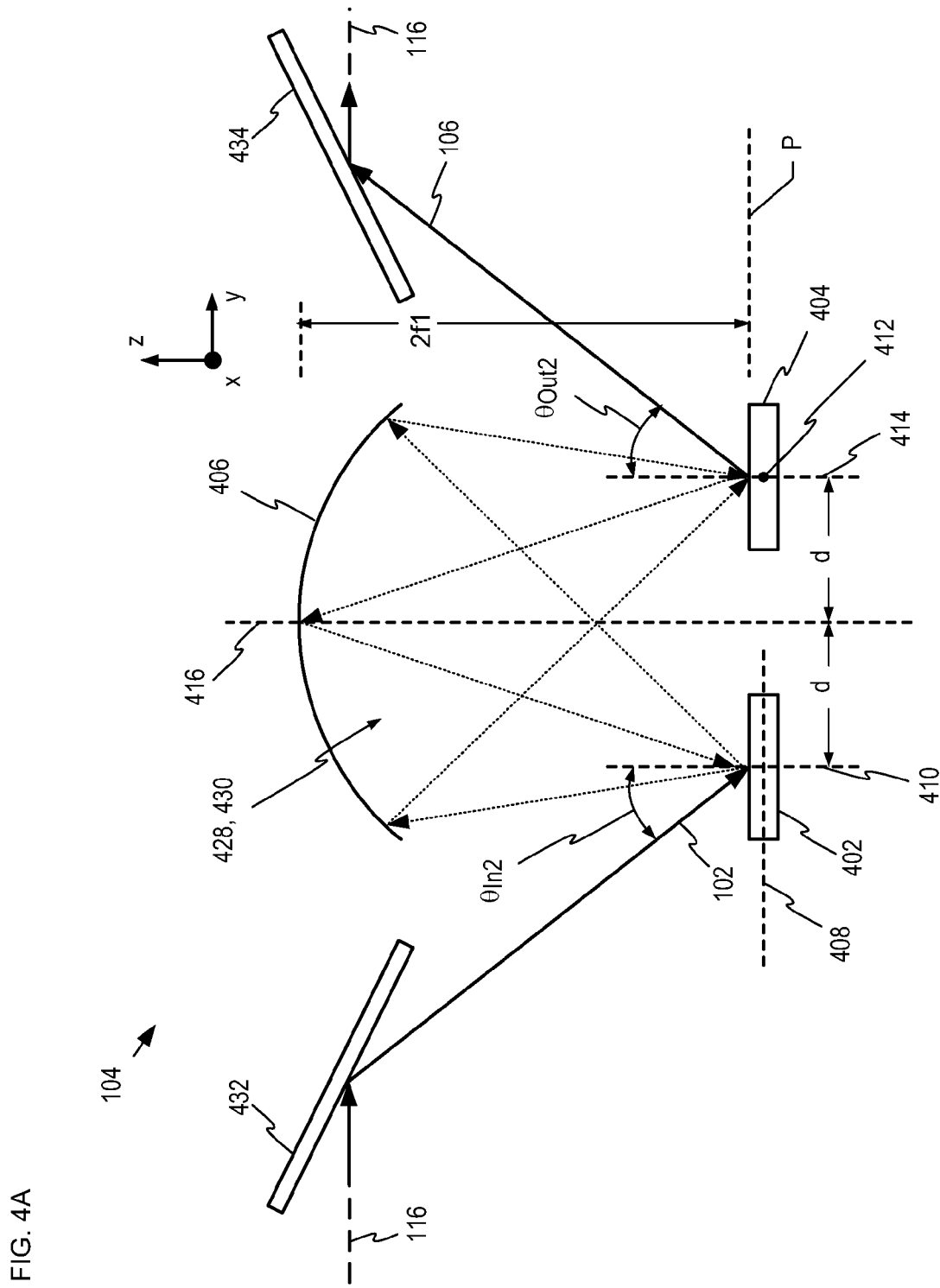
FIG. 4A depicts two-dimensional beam-steering system 104 in its quiescent state in accordance with the illustrative embodiment of the present invention.

FIG. 4A depicts two-dimensional beam-steering system 104 in its quiescent state in accordance with the illustrative embodiment of the present invention. System 104 comprises element 402, element 404, reflective imager 406 and bulk turning mirrors 432 and 434. System 104 receives input beam 102 along principle axis 116 and provides output beam 106 along output angle, $\theta_{Out2}$, with respect to principle axis 116. Output angle, $\theta_{Out2}$ is any desired angle within two-dimensional angular cone 108. System 104 is a multi-bounce optical system, where the number of bounces per element, n, is equal to 2.

Figure 5:
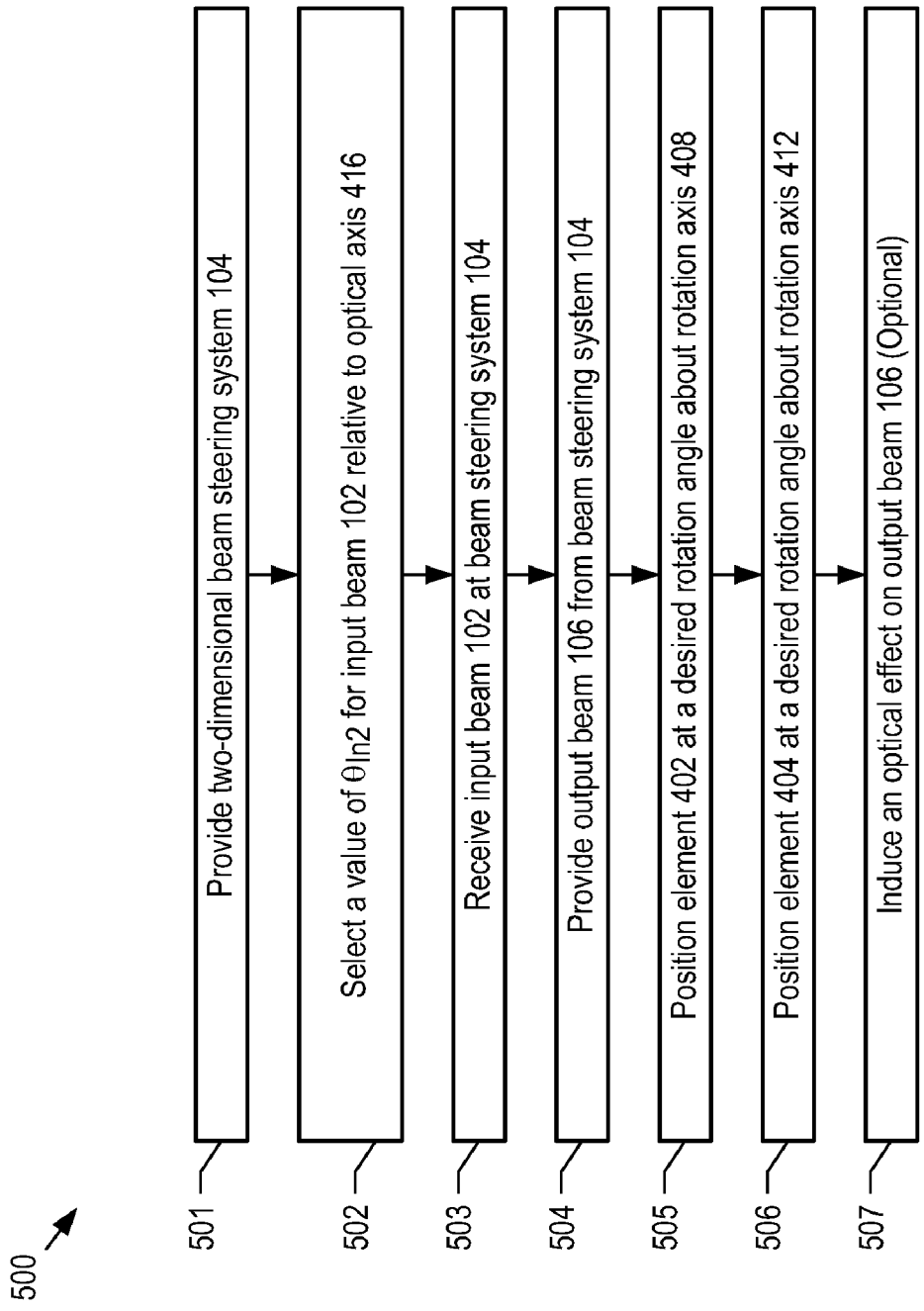
FIG. 5 depicts a method for controlling the direction of an output beam in two dimensions, in accordance with the illustrative embodiment of the present invention.

FIG. 5 depicts a method for controlling the direction of an output beam in two dimensions, in accordance with the illustrative embodiment of the present invention. Method 500 begins with operation 501, wherein two-dimensional beam-steering system 104 (hereafter referred to as system 104) is provided. Method 500 is described with continuing reference to FIGS. 1 and 4A-C. Method 500 begins with operation 501, wherein system 104 is provided.

Elements 402 and 404 are single-axis torsional MEMS mirrors. In the illustrative embodiment, each of elements 402 and 404 is analogous to element 300, described above and with respect to FIGS. 3A and 3B.

Although elements 402 and 404 are planar-electrode-driven MEMS devices, it will be clear to one skilled in the art, after reading this specification, how to make and use alternative embodiments of the present invention that comprise:
  i. torsional devices that comprise vertical comb-drive actuators; or
  ii. nano-electro-mechanical devices; or
  iii. macro-scale devices; or
  iv. thermally actuated devices; or v. microfluidically actuated devices; or vi. magnetically actuated devices; or vii. piezoelectric actuators; or viii. any combination of i, ii, iii, iv, v, vi, and vii.

Each of elements 402 and 404 comprises a mirror surface that is substantially reflective for input beam 102. In some embodiments, one or both of elements 402 and 404 comprises a surface that comprises one or more of an adaptive optic element, deformable mirror, spatial filter, phase modulator, spatial light modulator, shutter, chromatic filter, polarization filter, polarization phase filter, polarizer, and the like.

Element 402 is controllably rotatable about rotation axis 408 to any angle within its maximum angular range. Rotation axis 408 is aligned with the y-direction, as shown. Element 402 is characterized by mirror optical axis 410, which is centered on the reflective surface of element 402. Mirror optical axis 410 and rotation axis 408 intersect at the center of element 402.

In similar fashion, element 404 is controllably rotatable about rotation axis 412 to any angle within its maximum angular range. Rotation axis 412 is aligned with the x-direction, as shown. Element 404 is characterized by mirror optical axis 414, which is centered on the reflective surface of element 404. Mirror optical axis 414 and rotation axis 412 intersect at the center of element 404.

Reflective imager 406 comprises a spherical mirror that is substantially reflective for light signal 102. In the illustrative embodiment, reflective imager 406 is analogous to reflective imager 220, described above and with respect to FIG. 2B. Reflective imager 406 is characterized by focal length f1 and optical axis 416. In some embodiments, optical axis 416 and principle axis 116 are substantially orthogonal. Although the illustrative embodiment comprises a reflective imager that comprises a spherical mirror, it will be clear to one skilled in the art, after reading this specification, how to specify, make, and use a reflective imager that is an aspherical mirror, an elliptical mirror, or a mirror having a complex surface function.

Elements 402 and 404 and reflective imager 406 are arranged such that elements 402 and 404 are coplanar with plane P, which is located at a distance substantially equal to twice the focal distance of reflective imager 406 (i.e., 2f1). Plane P and optical axis 416 are substantially orthogonal. Further, elements 402 and 404 are arranged symmetrically about optical axis 416 such that mirror optical axes 410 and 414 are equidistant from and substantially coplanar with optical axis 416. When system 104 is in its quiescent state, the reflective surfaces of elements 402 and 404 are coplanar with plane P and the rotation angles of elements 402 and 404 about their respective rotation axes are zero. As a result, when system 104 is in its quiescent state, the optical path between input beam 102 and output beam 106 is symmetrically folded about optical axis 416 and $\theta_{Out2}$ and $\theta_{In1}$ are substantially equal.

Rotation axis 408 and rotation axis 412 are oriented orthogonally with respect to one another. As a result elements 402 and 404 and reflective imager 406 are collectively capable of steering output beam 106 along any direction within two-dimensional cone 108. In some embodiments, two-dimensional beam-steering is provided by a single MEMS device that is capable of rotation about two axes. It should be noted, however, that the use of a pair of single-axis torsional elements to provide two-dimensional beam steering can enable faster system performance.

The arrangement of reflective imager 406 and elements 402 and 404 is analogous to the arrangement of elements 204 and 212 of beam-steering system 218. As a result, for an input beam received at angle $\theta_{In1}$, with respect to optical axis 416, system 104 represents a single-bounce system.

Bulk turning mirror 432 is a bulk mirror that is oriented at a fixed angle with respect to principle axis 116. Bulk mirror 432 is oriented such that it receives input beam 102 and redirects it to element 402 at fixed input angle, $\theta_{In2}$, with respect to optical axis 416.

Bulk turning mirror 434 is a bulk mirror that is oriented at a fixed angle with respect to principle axis 116 and optical axis 416. Bulk mirror 434 is oriented such that it directs output beam 106 along principle axis 116 when system 104 is in its quiescent state.

At operation 502, the value of $\theta_{In2}$ is selected to be substantially equal to $3\theta_{In1}$.

At operation 503, input beam 102 is received at system 104. Input beam 102 is substantially focused onto element 402 such that input beam 102 has beam waist suitable to minimize loss of light due to clipping of the beam by element 402. Input beam 102 is received at angle $\theta_{In2}$, with respect to optical axis 416. Input beam 102 is reflected by element 402 as light beam 428 on optical path 430. By virtue of the value of $\theta_{In2}$, optical path 430 hits each of elements 402 and 412 twice. System 104, therefore, is characterized as a multi-bounce system, wherein n=2.

At operation 504, output beam 106 is provided from system 104. Output beam 106 is provided at angle $\theta_{Out2}$, with respect to optical axis 416.

At operation 505, a control voltage is applied to element 402 to control its rotation angle about rotation axis 408. As a result, this control voltage also controls the angle of output beam 106 in the x-z plane.

At operation 506, a control voltage is applied to element 404 to control its rotation angle about rotation axis 412. As a result, this control voltage also controls the angle of output beam 106 in the y-z plane.

Operations 505 and 506 collectively control the direction of output beam 106 along any angle within two-dimensional angle cone 108. As a result, operations 505 and 506 collectively enable output beam 106 to access point within area 120 and, therefore, any qubit 118-i,j within qubit array 114, as depicted in FIG. 1B.

A combination of rotatable elements and a multi-bounce optical system reduces the required angular range for torsional elements 402 and 404. As discussed above, and with respect to FIGS. 2A and 2B, each time a light beam is reflected from a torsional element, the angle of the reflected beam is changed by $2\Delta\phi$, wherein $\Delta\phi$ is the rotation angle of the torsional element. In a multi-bounce optical system, therefore, the angle of the reflected beam is changed by $2\Delta\phi$ each time the light is reflected from the torsional element. In other words, the impact of a rotation, $\Delta\phi$, of either of element 402 and 404 on the output angle, $\theta_{Out2}$, of output beam 106 is multiplied by n (i.e., $\Delta\theta_{Out2}=n2\Delta\phi$).

FIG. 4B depicts beam-steering system 104 in a first activated state in accordance with the illustrative embodiment of the present invention. Output beam 106-0 represents output beam 106 when element 404 is in its quiescent state. In the first activated state, element 404 is rotated about rotation axis 412 by $-\Delta\phi2$. Output beam 106-1 represents output beam 106 after rotation from the position of 106-0 within the y-z plane. Output beam 106-1 is rotated by $-4\Delta\phi2$ (i.e., $n2\Delta\phi2$, where n=2), which corresponds to the extreme negative output angle of beam-steering system 104 within the y-z plane of angle cone 108.

FIG. 4C depicts beam-steering system 104 in a second activated state in accordance with the illustrative embodiment of the present invention. Output beam 106-0 represents output beam 106 when element 404 is in its quiescent state. In the second activated state, element 404 is rotated about rotation axis 412 by $+\Delta\phi2$. Output beam 106-2 represents output beam 106 after rotation from the position of 106-0 within the y-z plane. Output beam 106-2 is rotated by $+4\Delta\phi2$ (i.e., $n2\Delta\phi2$, where n=2), which corresponds to the extreme positive output angle of beam-steering system 104 within the y-z plane of angle cone 108.

The present invention derives several benefits as a result of the magnification of the rotation angle. First, the maximum rotation angle of a torsional element, $\phi_{Max}$, to affect a desired angular range for output beam 106, $\theta_{Max}$, is reduced by a factor of n. Because the present invention reduces the requirement on angular range, the design space for elements 402 and 404 is relaxed. As a result, embodiments of the present invention can exhibit:

i. lower drive voltage requirement; or
ii. larger optical beam size; or
iii. simpler drive electronics; or
iv. lower polarization-dependent loss; or
v. faster response; or
vi. any combination of i, ii, iii, iv, and v.

Second, because the range of angles required for the torsional elements is reduced, the speed at which the elements can move from one position to another is increased.

In some embodiments, the value of $\theta_{In2}$ is increased so that the number of times that optical path 430 hits elements 402 and 404 is greater than 2. It should be noted, however, that aberrations on output beam 106 typically increase with increasing n.

In some embodiments, at least one of element 402 and 404 is suitable for inducing an optical effect on output beam 106. In these embodiments, method 500 continues with optional operation 507, wherein an optical effect, such as phase modulation, spatial modulation, chromatic filtering, and the like, is induced on output beam 106. In a multi-bounce system, the magnitude of such an induced effect is multiplied by the number of times that light beam 428 hits the element. For example, in an embodiment wherein one of elements 402 and 404 comprises a phase modulator, the phase modulator induces the same amount of modulation each time the optical path 430 hits the element (i.e., the amount of phase modulation is doubled when n=2, tripled when n=3, etc.). Stronger optical effects are enabled, therefore, than might be practically achievable with only one interaction between an element and the light beam. It should be noted that multiplication of the induced effect must be accounted for in the design of the optical beam-steering system or in a control loop that controls the effect. In some embodiments, aberration correction is employed to ensure that an optical beam is incident in the same place each time that it arrives at the same element. Such aberration correction is particularly attractive in embodiments wherein an element comprises a spatial light modulator.

Figure 6:
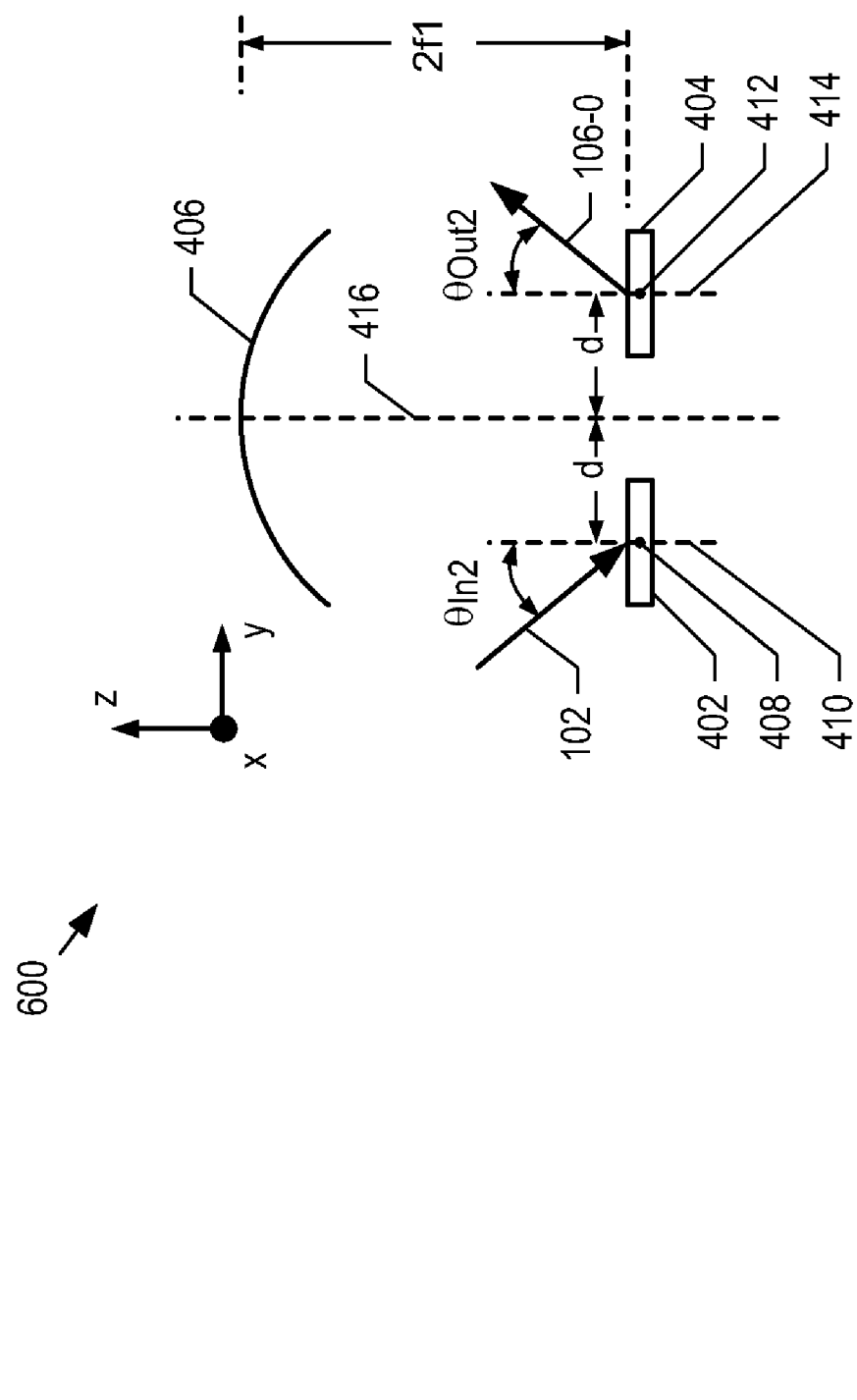
FIG. 6 depicts a schematic diagram of details of a one-dimensional beam-steering system in accordance with a first alternative embodiment of the present invention.

FIG. 6 depicts a schematic diagram of details of a one-dimensional beam-steering system in accordance with a first alternative embodiment of the present invention. Beam-steering system 600 comprises element 402, element 404, and reflective imager 406. Beam-steering system 600 receives input beam 102 at a fixed angle and provides output beam 106 along any desired angle within a one-dimensional angular cone.

Beam-steering system 600 is analogous to beam-steering system 104, with the exception that rotation axes 408 and 412 of elements 402 and 404, respectively, are parallel, rather than orthogonal with respect to one another. As a result, the maximum angular range for output beam 106, within the y-z plane, is twice that attainable with beam-steering system 104.

FIG. 7A depicts a schematic diagram of details of a two-dimensional beam-steering system in accordance with a second alternative embodiment of the present invention. Beam-steering system 700 comprises element array 706 and reflective imager 406. Beam-steering system 700 is suitable for independently steering each of a plurality of output beams along any angle within two-dimensional angular cone 108. Beam-steering system 700 is analogous to two independent instances of system 104, wherein reflective imager 406 and optical axis 416 are common to both systems.

Beam-steering system 700 receives input beam 102 at an angle of $\theta_{In2}$ with respect to optical axis 416. Beam-steering 700 provides output beam 106 at an angle of $\theta_{Out2}$ with respect to optical axis 416.

In similar fashion, beam-steering system 700 receives input beam 714 at an angle of $\theta_{In3}$ with respect to optical axis 416. Beam-steering 700 provides output beam 716 at an angle of $\theta_{Out3}$ with respect to optical axis 416.

FIG. 7B depicts a schematic diagram of details of element array 706. Element array 706 comprises elements 402, 404, 702, and 704.

Mirror optical axes 410, 414, 710, and 712, of elements 402, 404, 702, and 704 are each parallel to optical axis 416. Elements 402, 404, 702, and 704 form a 2×2 array of elements that is symmetrically arranged about optical axis 416, which defines the intersection of the x- and y-axes as shown. Elements 402 and 404 form a first working pair of elements. Elements 702 and 704 form a second working pair of elements. Each working pair is arranged diagonally within the 2×2 array. Each element is separated from the y-axis by a distance equal to d. Further, each element is separated from the x-axis by a distance equal to d1. In some embodiments, d and d1 are equal. In some embodiments, d and d1 are not equal. In some embodiments, distance d1 is made as small as possible in order to reduce aberration. Still further, optical axis 416 and mirror optical axes 410 and 414 are coplanar in first plane P1. In similar fashion, optical axis 416 and mirror optical axes 710 and 712 are coplanar in second plane P2. In some embodiments, elements 402 and 404 are arranged such one of rotation axes 408 and 412 is orthogonal to plane P1 and the other of rotation axes 408 and 412 is coplanar with plane P1 and orthogonal to optical axis 416. In some embodiments, elements 702 and 704 are arranged such one of rotation axes 708 and 412 is orthogonal to plane P2 and the other of rotation axes 708 and 412 is coplanar with plane P2 and orthogonal to optical axis 416.

It should be noted that the number of elements included in element array 706 is limited only by the optical system and physical limitations on size and spacing of the elements themselves. It is desirable that elements that operate in pairs be symmetrically arranged about optical axis 416, however. Further, in order to enable two-dimensional beam-steering, it is desirable that the rotation axes of each element in a working pair be arranged orthogonally to one another.

Figure 8:
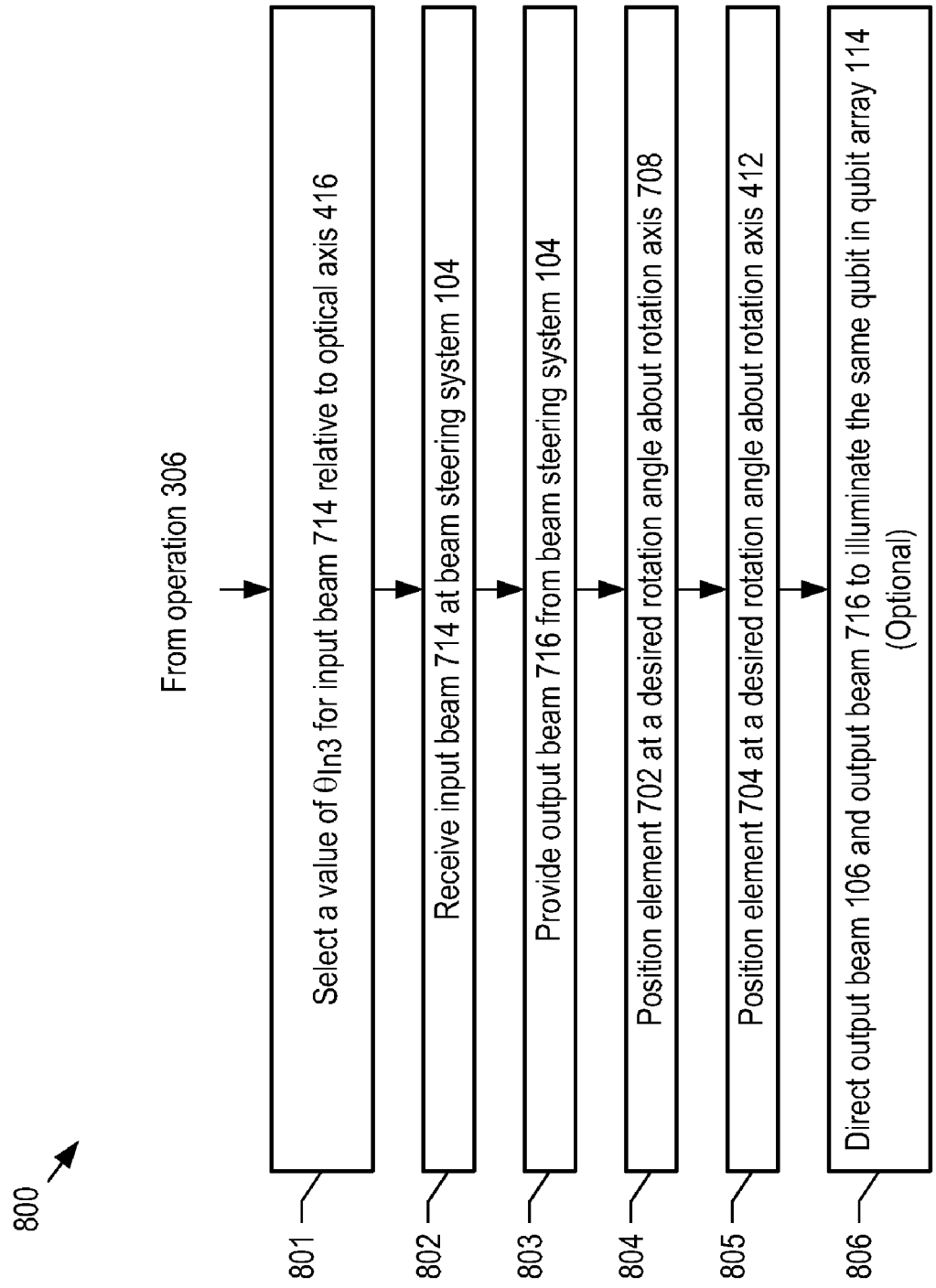
FIG. 8 depicts a method for independently controlling the direction of each of a plurality of output beam in two dimensions, in accordance with the second alternative embodiment of the present invention.

FIG. 8 depicts a method for independently controlling the direction of each of a plurality of output beam in two dimensions, in accordance with the second alternative embodiment of the present invention. Method 800 includes the operations of method 300 and continues with operation 801, wherein a value for the angle of input beam 702, relative to optical axis 416, is selected. Operation 801 is analogous to operation 302 of method 300.

At operation 802, input beam 714 is received at element 702 and reflected by element 702 as light signal 718 on optical path 720. By virtue of the value of $\theta_{In3}$, optical path 718 hits each of elements 702 and 712 twice.

At operation 803, output beam 716 is provided at element 704. Output beam 716 is provided at angle $\theta_{Out3}$, with respect to optical axis 416. When system 104 is in its quiescent state output angle $\theta_{Out3}$ and input angle $\theta_{In3}$ are substantially equal.

At operation 804, a control voltage is applied to element 702 to control its rotation angle about rotation axis 708.

At operation 805, a control voltage is applied to element 704 to control its rotation angle about rotation axis 412.

Operations 804 and 805 collectively enable control of the direction of output beam 716 along any angle within two-dimensional angle cone 108.

In some embodiments, method 800 continues with optional operation 806, wherein output beam 106 and output beam 716 are each directed to the same point in space. In some embodiments, this point in space is the location of a single qubit 118-i,j in qubit array 114.

Figures 9A, 9B:
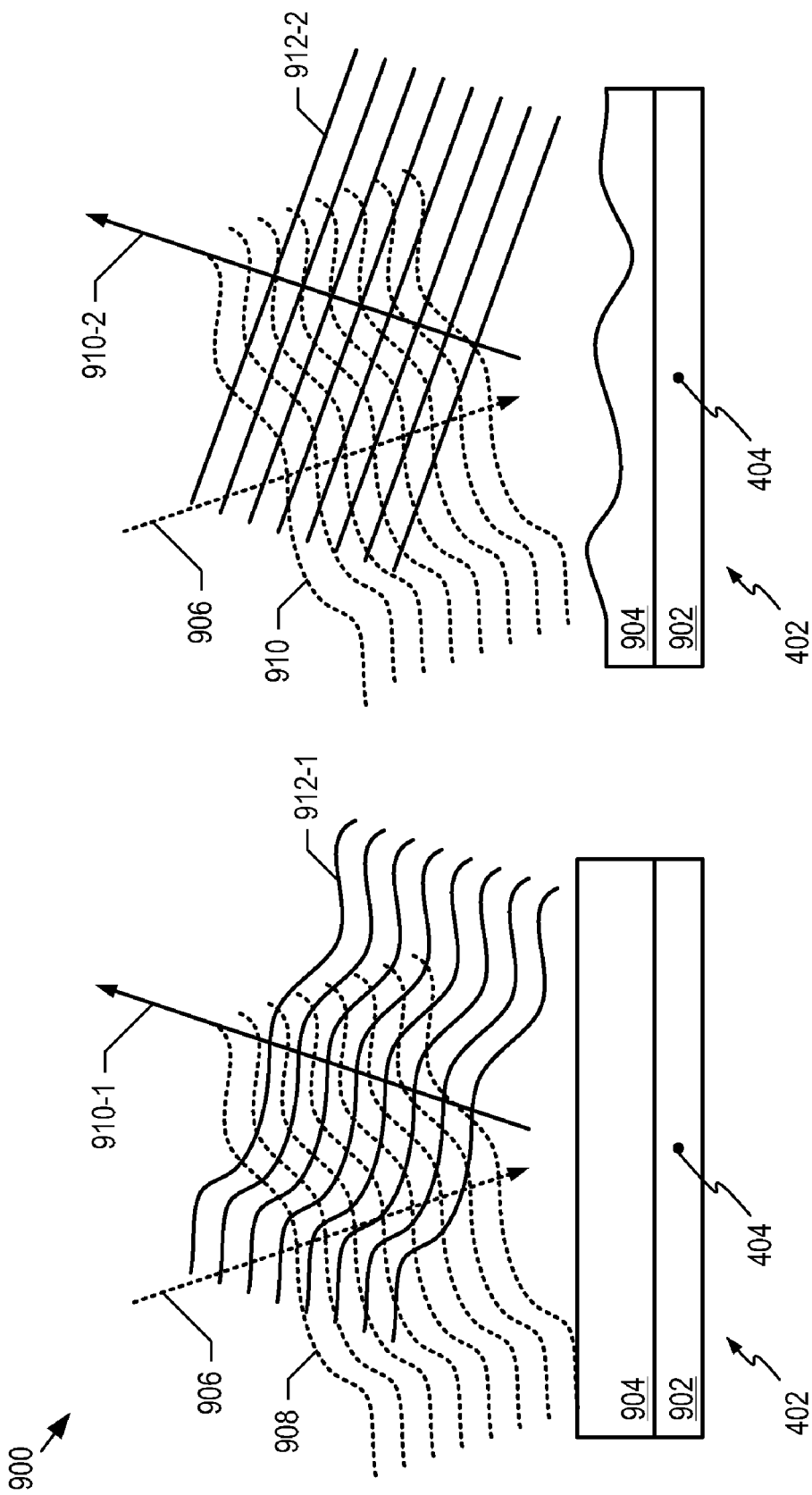
FIG. 9A depicts a side view of a torsional MEMS element for inducing an optical effect on output beam 106, in an unenergized state, in accordance with a third alternative embodiment of the present invention.
FIG. 9B depicts a side view of a torsional MEMS element for inducing an optical effect on output beam 106, in an energized state, in accordance with the third alternative embodiment of the present invention.

FIGS. 9A and 9B depict schematic diagrams of a side view of a torsional MEMS element for inducing an optical effect on output beam 106 in accordance with a third alternative embodiment of the present invention. Element 900 comprises plate 902 and surface 904. Plate 902 is analogous to plate 302, described above and with respect to FIGS. 3A and 3B.

Surface 904 is disposed on plate 902. Surface 904 is a deformable mirror suitable for controlling wavefront 912 of output beam 910.

FIG. 9A depicts surface 904 in an unenergized state, in which it is a flat mirror surface. Light beam 906 is characterized by non-planar wavefront 908. Unenergized surface 904 reflects light beam 906 as output beam 910-1, which is characterized wavefront 912-1, which is substantially unchanged from wavefront 908.

FIG. 9B depicts element 900 in an energized state, wherein its surface has been deformed to provide wavefront correction for light beam 906. Light beam 906 is reflected by energized surface 904 as output beam 910-2. By virtue of the wavefront correction induced by energized surface 904, output beam 910-2 is characterized by substantially planar wavefront 912-2.

It should be noted that element 900 is only one example of an element that induces an optical effect on a reflected light beam. One skilled in the art would recognize that alternative embodiments of the present invention can be envisioned wherein surface 904 comprises one or more of an adaptive optic element, deformable mirror, spatial filter, phase modulator, spatial light modulator, shutter, chromatic filter, polarization filter, polarization phase filter, polarizer, and the like. It should also be noted that surface 904 can an active surface, such as that depicted in FIGS. 9A and 9B, or a passive surface that remains physically unchanged during operation.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
   an optical system, wherein the optical system receives a first beam at a first input angle, $\theta_{In1}$, with respect to an optical axis, and wherein the optical system directs the first beam at a first output angle, $\theta_{Out1}$, with respect to the optical axis, and further wherein the optical system comprises:
   a first element whose angular position about a first rotation axis is controllable;
   a second element whose angular position about a second rotation axis is controllable; and
   a reflective imager;
   wherein a change in the angular position of the first element about the first rotation axis by $\Delta\theta 1$ results in a change in $\theta_{Out1}$ that is greater than $|2\times\Delta\theta 1|$; and
   wherein a change in the angular position of the second element about the second rotation axis by $\Delta\theta 2$ results in a change in $\theta_{Out1}$ that is greater than $|2\times\Delta\theta 2|$.

2. The apparatus of claim 1:
   wherein the first element, reflective imager, and second element collectively define a first optical path in which the first beam is incident on each of the first element and the second element n times, where n>1;
   wherein the change in the angular position of the first element about the first rotation axis by $\Delta\phi 1$ results in a change in $\theta_{Out1}$ that is substantially equal to $|2n\Delta\phi 1|$; and
   wherein the change in the angular position of the second element about the second rotation axis by $\Delta\phi 2$ results in a change in $\theta_{Out1}$ that is substantially equal to $|2n\Delta\phi 2|$.

3. The apparatus of claim 1 wherein the optical system further comprises:
   a third element whose angular position about a third rotation axis is controllable; and
   a fourth element whose angular position about a fourth rotation axis is controllable;
   wherein the first element, reflective imager, and second element collectively define a first optical path in which the first beam is incident on each of the first element and the second element n times, where n>1;
   wherein the optical system receives a second beam at a second input angle, $\theta_{In2}$, with respect to the optical axis, and wherein the optical system directs the second beam at a second output angle, $\theta_{Out2}$, with respect to the optical axis;
   wherein the third element, reflective imager, and fourth element collectively define a second optical path in which the second beam is incident on each of the third element and the fourth element m times, where m>1;
   wherein a change in the angular position of the third element about the third rotation axis by $\Delta\phi 3$ results in a change in $\theta_{Out2}$ that is substantially equal to $|2m\Delta\phi 3|$; and
   wherein a change in the angular position of the fourth element about the fourth rotation axis by $\Delta\phi 4$ results in a change in $\theta_{Out2}$ that is substantially equal to $|2m\Delta\phi 4|$.

4. The apparatus of claim 3 wherein m and n are equal.

5. The apparatus of claim 1 wherein the first rotation axis and second rotation axis are orthogonal.

6. The apparatus of claim 1 wherein the each of the first element and the second element is a mirror.

7. The apparatus of claim 1 wherein at least one of the first element and the second element comprises a mirror having a surface that is controllably deformable.

8. The apparatus of claim 1 wherein at least one of the first element and the second element comprises a spatial light modulator.

9. The apparatus of claim 1 wherein at least one of the first element and the second element comprises a chromatic filter.

10. A method comprising:
    providing an optical system having an optical axis, wherein the optical system comprises a first element, a second element, and a reflective imager, wherein the first element is controllably rotatable about a first rotation axis, and wherein the second element is controllably rotatable about a second rotation axis;

receiving a first input beam at the optical system, wherein the first input beam is received at an angle, $\theta_{In1}$, relative to the optical axis;

providing a first output beam from the optical system, wherein the first output beam is provided at an angle, $\theta_{Out1}$, relative to the optical axis;

selecting a first value for $\theta_{In1}$, wherein the first value enables a change in the rotation angle, $\Delta\phi 1$, of the first element about the first rotation axis to induce a change in $\theta_{Out1}$ that is greater than $|2\Delta\phi 1|$, and wherein the first value enables a change in the rotation angle, $\Delta\phi 2$, of the second element about the second rotation axis to induce a change in $\theta_{Out1}$ that is greater than $|2\Delta\phi 2|$;

controlling the angular position of a first element about a first rotation axis; and controlling the angular position of a second element about a second rotation axis.

11. The method of claim 10 further comprising:

selecting the first value for $\theta_{In1}$ such that the first value enables a first optical path comprising the first element, the second element, and the reflective imager, wherein the first optical path is incident on each of the first element and second element n times, where n>1;

receiving a second input beam at the optical system, wherein the second input beam is received at a second input angle, $\theta_{In2}$, relative to the optical axis;

providing a second output beam from the optical system, wherein the second output beam is provided at an angle, $\theta_{Out2}$, relative to the optical axis;

selecting a second value for $\theta_{In2}$ such that the second value enables a second optical path comprising a third element, a fourth element, and the reflective imager, wherein the second optical path is incident on each of the third element and fourth element m times, where m>1, and wherein the second value enables a change in the rotation angle, $\Delta\phi 3$, of the third element about the third rotation axis to induce a change in $\theta_{Out2}$ that is greater than $|2\Delta\phi 3|$, and wherein the second value enables a change in the rotation angle, $\Delta\phi 4$, of the fourth element about the fourth rotation axis to induce a change in $\theta_{Out2}$ that is greater than $|2\Delta\phi 4|$;

controlling the angular position of the third element about a third rotation axis; and controlling the angular position of the fourth element about a fourth rotation axis.

12. The method of claim 11 further comprising:

directing the first output beam to a first position; and directing the second output beam to the first position.

13. The method of claim 10 further comprising controlling the wavefront of the first output beam.

14. The method of claim 10 further comprising controlling the phase of the first output beam.

15. The method of claim 10 further comprising controlling the polarization of the first output beam.

16. The method of claim 10 further comprising providing one of the first element and the second element as a spatial modulator.

17. The method of claim 10 further comprising controlling the wavelength content of the first output beam.

* * * * *